United States Patent
Yoshida et al.

(10) Patent No.: US 10,953,827 B2
(45) Date of Patent: Mar. 23, 2021

(54) VEHICLE BODY FRONT STRUCTURE

(71) Applicant: HONDA MOTOR CO., LTD., Tokyo (JP)

(72) Inventors: Masayasu Yoshida, Wako (JP); Takuya Morisawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 16/435,794

(22) Filed: Jun. 10, 2019

(65) Prior Publication Data
US 2019/0375356 A1 Dec. 12, 2019

(30) Foreign Application Priority Data
Jun. 12, 2018 (JP) .............................. JP2018-112341

(51) Int. Cl.
*B60R 19/18* (2006.01)
*B62D 21/15* (2006.01)

(52) U.S. Cl.
CPC ............ *B60R 19/18* (2013.01); *B62D 21/155* (2013.01); *B62D 21/157* (2013.01); *B60R 2019/1806* (2013.01)

(58) Field of Classification Search
CPC ............ B60R 19/18; B60R 2019/1806; B62D 21/155; B62D 21/157
IPC ............ B60R 19/18,2019/1806; B62D 21/155, 21/157
See application file for complete search history.

(56) References Cited

U.S. PATENT DOCUMENTS

| 8,608,231 B1 | 12/2013 | Mendivil et al. | |
|---|---|---|---|
| 2005/0211496 A1* | 9/2005 | Ito | B60K 15/063 180/314 |
| 2011/0095568 A1* | 4/2011 | Terada | B62D 21/11 296/187.09 |
| 2012/0248820 A1* | 10/2012 | Yasui | B60R 19/34 296/187.09 |
| 2013/0320710 A1* | 12/2013 | Watanabe | B62D 21/152 296/187.09 |
| 2014/0312654 A1* | 10/2014 | Komiya | B62D 25/082 296/187.09 |
| 2015/0274208 A1* | 10/2015 | Segawa | B62D 25/085 180/232 |
| 2016/0152273 A1* | 6/2016 | Kuriyama | B62D 25/08 296/187.09 |

(Continued)

FOREIGN PATENT DOCUMENTS

JP 6284556 B2 2/2018

*Primary Examiner* — Lori L Lyjak
(74) *Attorney, Agent, or Firm* — Rankin, Hill & Clark LLP

(57) ABSTRACT

A vehicle body front structure includes: a side frame extending in a front-rear direction in a front part of a vehicle body; a branch frame provided on a vehicle width direction outer side of the side frame; and a coupling member attached to and between the side frame and the branch frame. The branch frame has a rear end portion housed in the side frame and fixed to a vehicle width direction inner wall portion of the side frame. A ridgeline formed on the branch frame is aligned with a ridgeline formed on the inner wall portion of the side frame in the front-rear direction. A ridgeline formed on the coupling member is aligned with a ridgeline formed on an outer wall portion of the side frame in the front-rear direction.

14 Claims, 6 Drawing Sheets

(56) References Cited

U.S. PATENT DOCUMENTS

2017/0210425 A1   7/2017  Sekiguchi et al.
2017/0217501 A1*  8/2017  Takeda .................. B62D 25/08

* cited by examiner

VEHICLE BODY FRONT STRUCTURE

CROSS-REFERENCE TO RELATED APPLICATIONS

The present application claims priority under 35 U.S.C. § 119 to Japanese Patent Application No. 2018-112341, filed on Jun. 12, 2018, the contents of which are hereby incorporated by reference in their entirety.

BACKGROUND OF THE INVENTION

1. Field of the Invention

The present invention relates to a vehicle body front structure.

2. Description of the Related Art

U.S. Pat. No. 8,608,231 (Patent Document 1) describes a structure designed to increase the amount of absorption of impact energy caused by a collision (small overlap collision) that occurs on the vehicle width direction outer side of the side frame. According to the vehicle body front structure described in Patent Document 1, an energy absorption member having an L-shape in plan view is fixed to an outer side surface of the front side frame in order to apply a bending moment to the outer side surface of the front side frame so that the small overlap collision inputted in a front-rear direction is converted into a right-left direction stress.

According to the vehicle body front structure described in Patent Document 1, the front side frame is bent and moves inward in the vehicle width direction. For this reason, when a component which is weak against a collision, such as a high-voltage electric component for an electric car, is arranged near an inner side surface of the front side frame, it is difficult to adopt this vehicle body front structure.

Japanese Patent No. 6284556 (Patent Document 2) describes a structure in which a branch gusset extends obliquely from an inner side surface (inner central wall) of a front side frame, penetrates a cross-section of the front side frame, and has a rear surface joined to an outer panel.

SUMMARY OF THE INVENTION

The structure described in Patent Document 2 is designed to transmit a load inputted to the branch gusset to a vehicle width direction inner wall portion of the front side frame. The front side frame may possibly be bent and move inward in the vehicle width direction in this structure as well.

The present invention has been made in view of the aforementioned circumstances. An object of the present invention is to provide a vehicle body front structure capable of restraining a side frame from moving inward in a vehicle width direction due to the bending of the side frame.

To attain the object, a vehicle body front structure of an aspect of the present invention has the following features: the vehicle body front structure includes a side frame extending in a front-rear direction in a front part of a vehicle body, a branch frame provided on a vehicle width direction outer side of the side frame, and a coupling member attached to and between the side frame and the branch frame; the side frame has an inner wall portion on a vehicle width direction inner side and an outer wall portion on a vehicle width direction outer side; the inner wall portion has a ridgeline formed thereon; the outer wall portion has a ridgeline formed thereon; the branch frame has a ridgeline formed thereon; the coupling member has a ridgeline formed thereon; the branch frame has a rear end portion housed in the side frame and fixed to the inner wall portion of the side frame; the ridgeline of the branch frame is aligned with the ridgeline of the inner wall portion of the side frame in the front-rear direction; and the ridgeline of the coupling member is aligned with the ridgeline of the outer wall portion in the front-rear direction.

According to the present invention, it is possible to restrain the side frame from moving inward in the vehicle width direction due to the bending of the side frame.

DETAILED DESCRIPTION OF THE EMBODIMENTS

Next, a vehicle body front structure according to an embodiment of the present invention will be described below in detail with reference to the drawings as appropriate. Note that in the following description, expressions to indicate directions such as front-rear, right-left, up-down, and so forth will be based on the viewpoint of a passenger (a driver) in a vehicle. Meanwhile, the following description will discuss a structure on a left side of a vehicle out of a right and left pair of vehicle body front structures.

Figure 1:
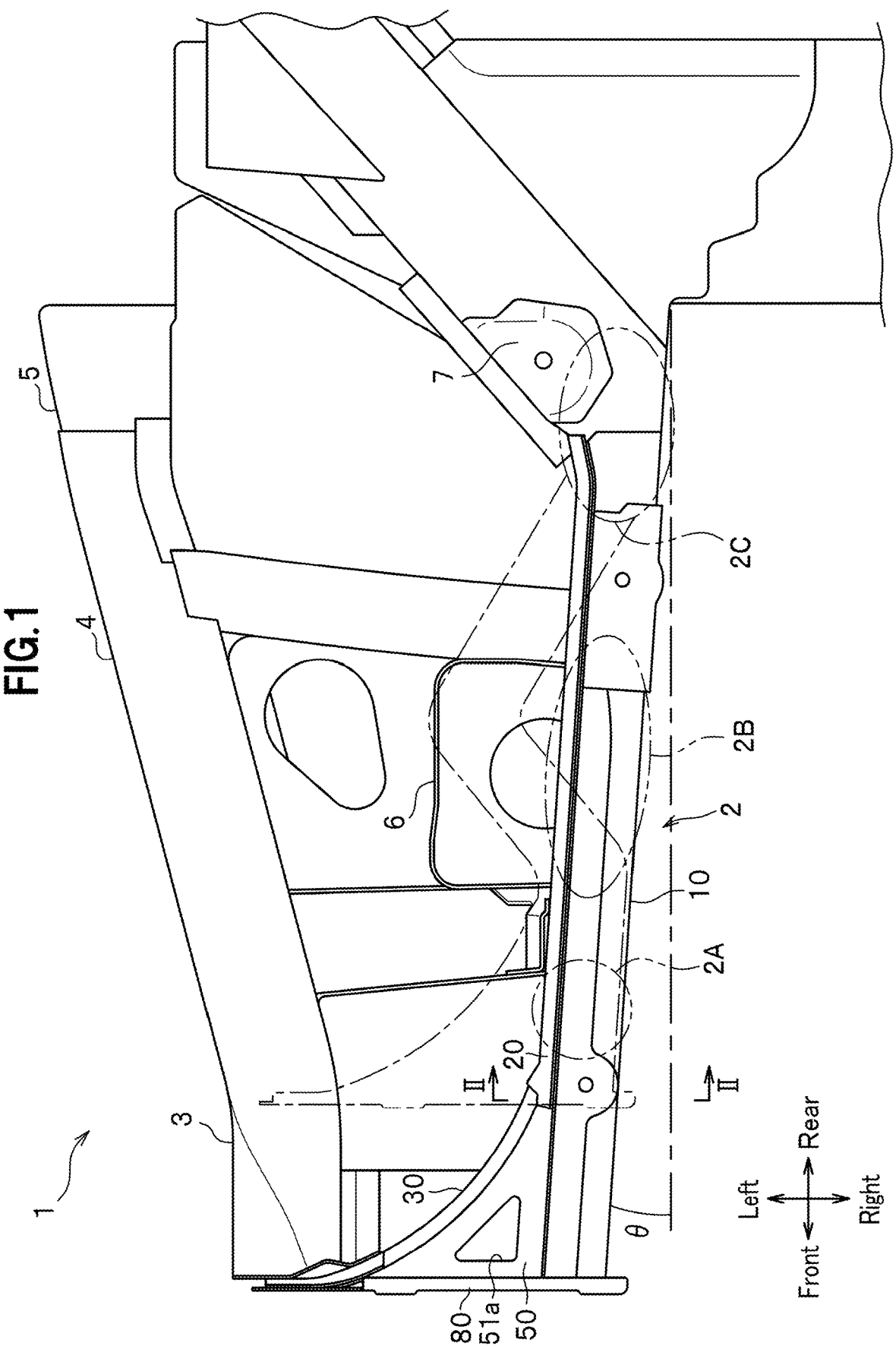
FIG. 1 is a bottom view schematically showing a vehicle body front structure according to an embodiment of the present invention.
Figure 2:
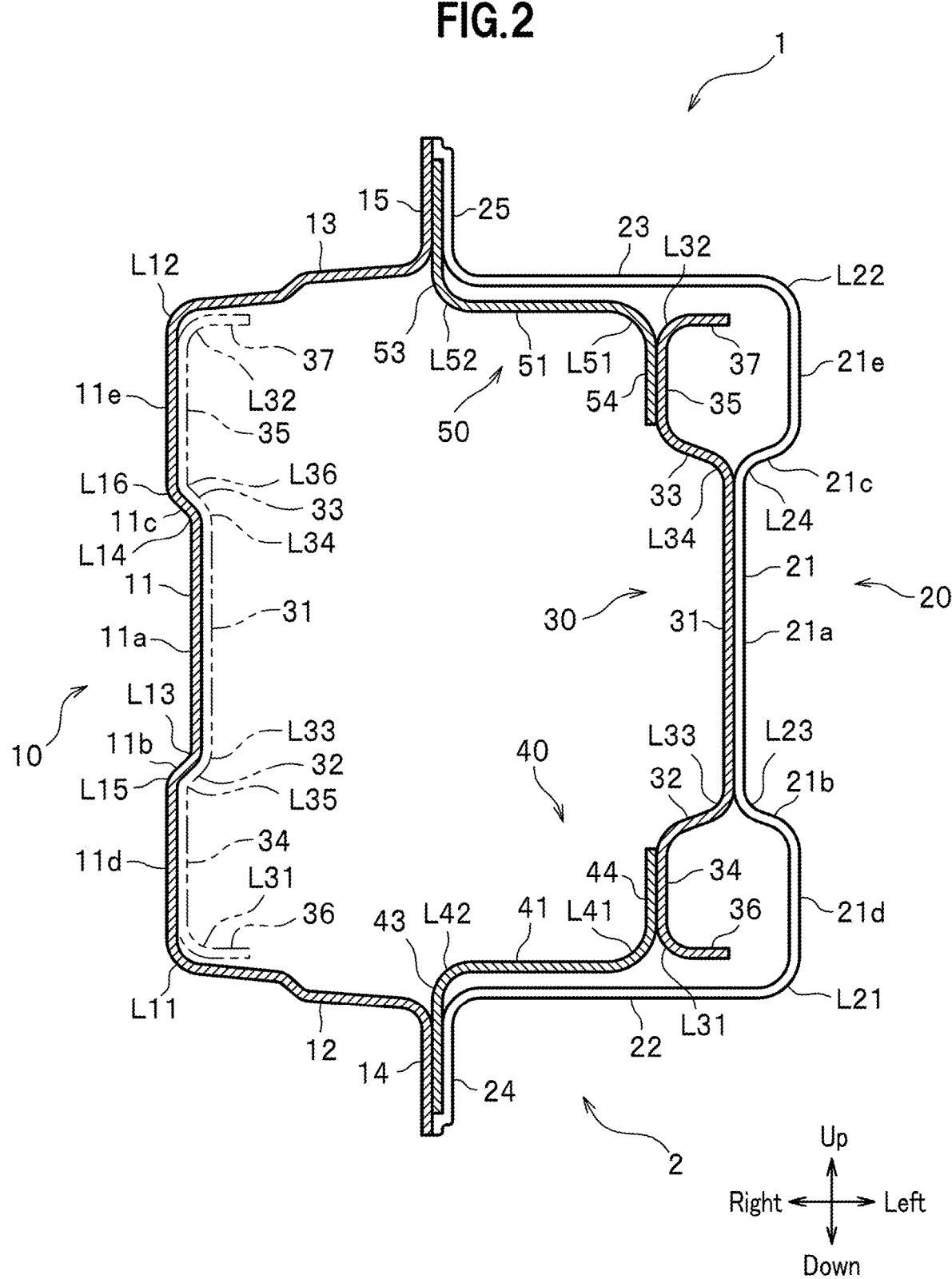
FIG. 2 is a cross-sectional view taken along line II-II in FIG. 1.
Figure 3:
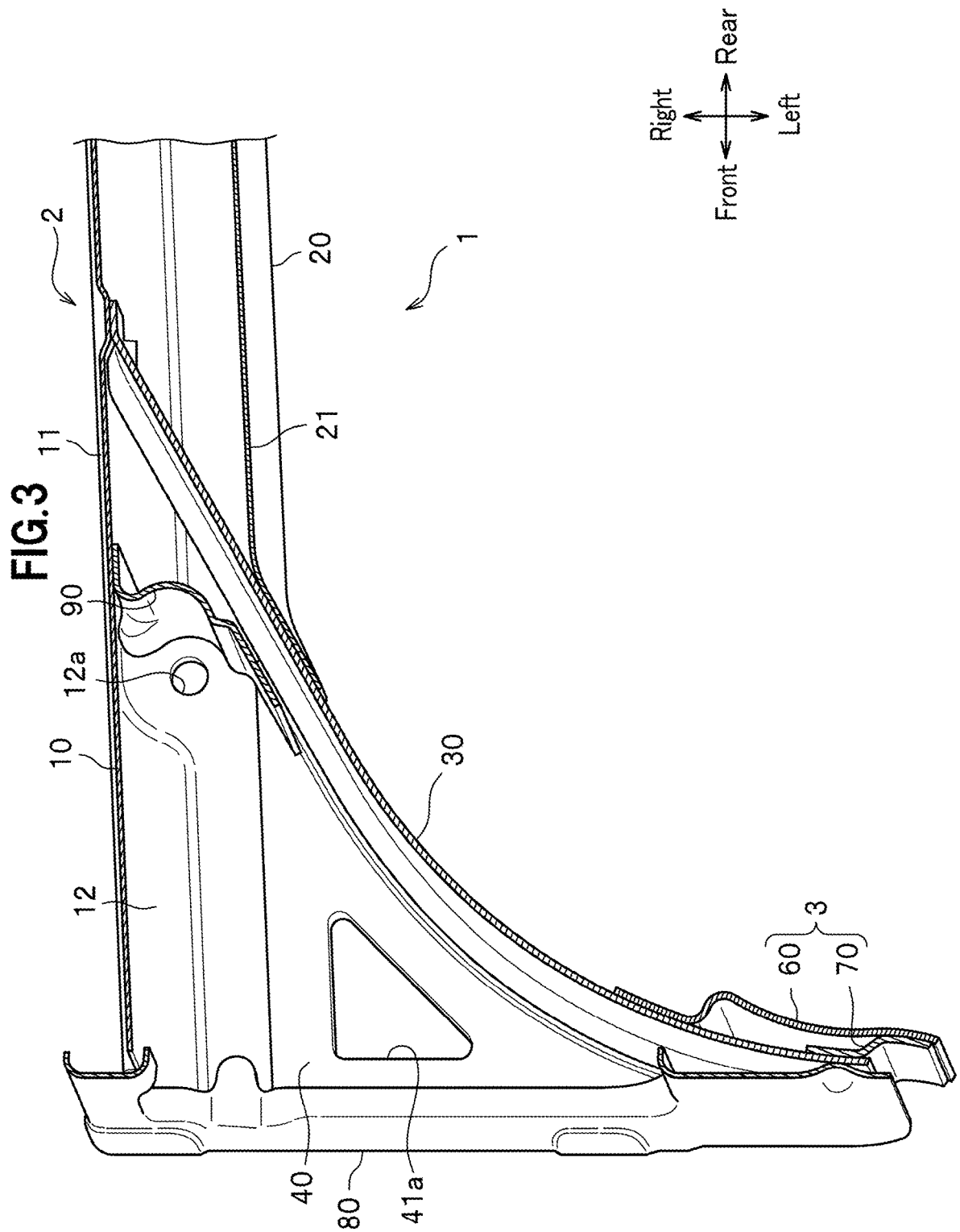
FIG. 3 is a cross-sectional view schematically showing the internal structure of a front side frame according to the embodiment of the present invention.

As shown in FIG. 1, a vehicle body front structure 1 according to the embodiment of the present invention has a front side frame 2, a lower member 3, an upper member 4, a front pillar 5, a branch frame 30, coupling plates (coupling members) 40 and 50 (see FIG. 2), a bumper beam attachment plate 80, and a bracket 90 (see FIG. 3).

Front Side Frame

The front side frame 2 is a metal structural member provided at a vehicle-width direction end portion of a front part of a vehicle and extending in a front-rear direction. The front side frame 2 is arranged obliquely relative to the front-rear direction in such a way that front side frame 2 extends outward in the vehicle width direction as the front side frame 2 extends forward (see the angle θ indicated in FIG. 1). A high-voltage electric component (not shown) is arranged on a vehicle width direction inner side of the front side frame 2.

As shown in FIG. 2, the front side frame 2 has a closed cross-section with a substantially rectangular shape in front view and has an inner panel 10 and an outer panel 20.

Inner Panel

The inner panel 10 is a member that constitutes a vehicle width direction inner part of the front side frame 2. The inner panel 10 integrally includes an inner wall portion 11 that extends in the front-rear direction, a lower wall portion 12 that extends outward in the vehicle width direction from a lower end portion of the inner wall portion 11, an upper wall portion 13 that extends outward in the vehicle width direction from an upper end portion of the inner wall portion 11, a flange portion 14 that extends downward from a vehicle width direction outer end portion of the lower wall portion 12, and a flange portion 15 that extends upward from a vehicle width direction outer end portion of the upper wall portion 13.

The inner wall portion 11 includes a concave wall portion 11a that constitutes an intermediate portion located intermediate of an up-down direction length of the inner wall portion 11, a shoulder wall portion 11b that extends substantially inward in the vehicle width direction from a lower end portion of the concave wall portion 11a, a shoulder wall portion 11c that extends substantially inward in the vehicle width direction from an upper end portion of the concave wall portion 11a, a convex wall portion 11d that extends downward from a lower end portion of the shoulder wall portion 1ib, and a convex wall portion 11e that extends upward from an upper end portion of the shoulder wall portion 11c. In other words, the inner wall portion 11 includes a groove section A1 (see FIG. 6) located intermediate of the up-down direction length of the inner wall portion 11, extending in the front-rear direction, and recessed inwardly of the front side frame 2 (outward in the vehicle width direction).

Outer Panel

The outer panel 20 constitutes a vehicle width direction outer part of the front side frame 2. The outer panel 20 integrally includes an outer wall portion 21 that extends in the front-rear direction, a lower wall portion 22 that extends inward in the vehicle width direction from a lower end portion of the outer wall portion 21, an upper wall portion 23 that extends inward in the vehicle width direction from an upper end portion of the outer wall portion 21, a flange portion 24 that extends downward from a vehicle width direction inner end portion of the lower wall portion 22, and a flange portion 25 that extends upward from a vehicle width direction inner end portion of the upper wall portion 23.

The flange portion 24 is joined to the flange portion 14 of the inner panel 10 by welding or the like. The flange portion 25 is joined to the flange portion 15 of the inner panel 10 by welding or the like.

Figure 5:
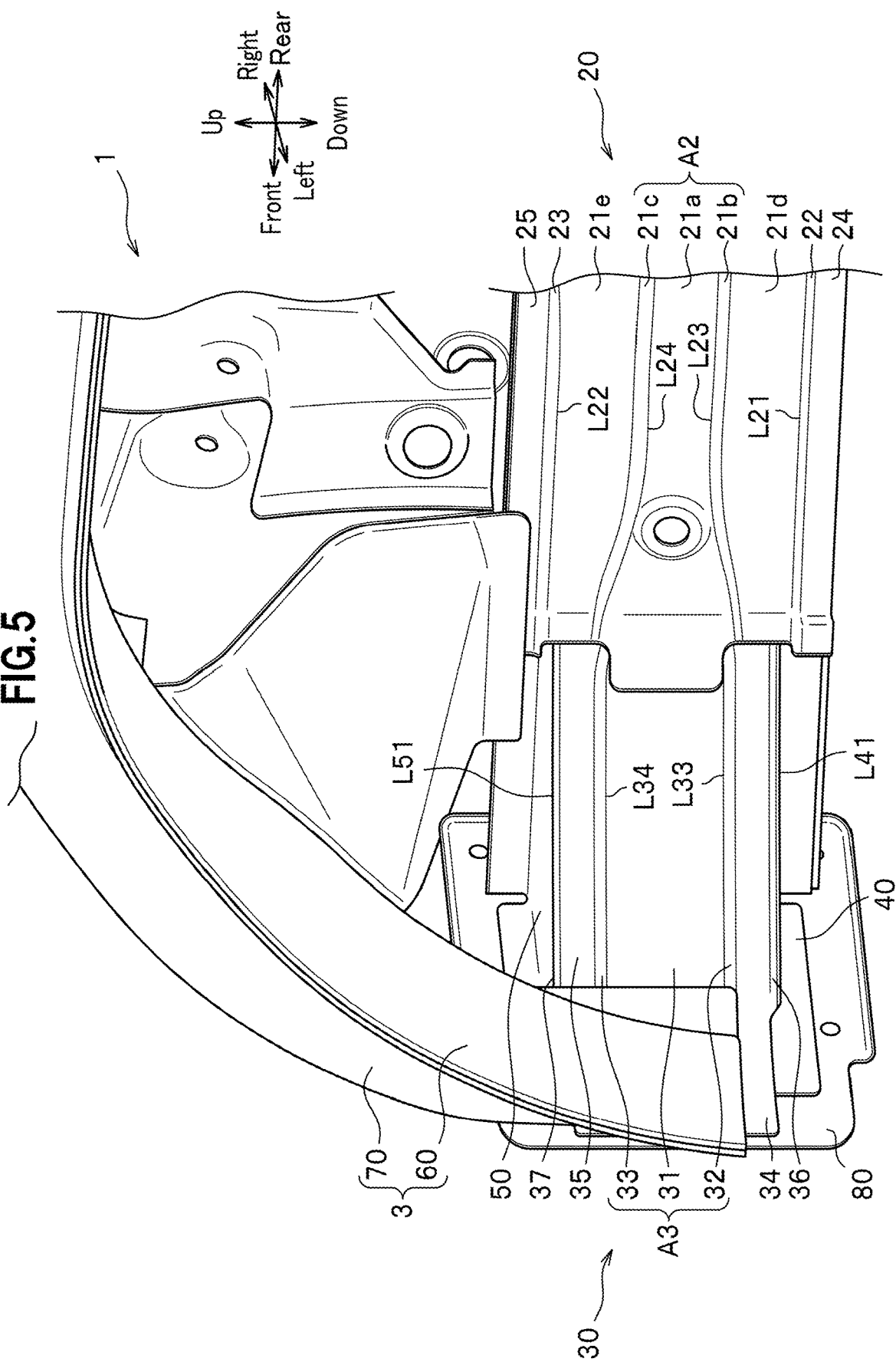
FIG. 5 is another perspective view schematically showing the vehicle body front structure according to the embodiment of the present invention.

The outer wall portion 21 includes a concave wall portion 21a that constitutes an intermediate portion located intermediate of an up-down direction length of the outer wall portion 21, a shoulder wall portion 21b that extends substantially outward in the vehicle width direction from a lower end portion of the concave wall portion 21a, a shoulder wall portion 21c that extends substantially outward in the vehicle width direction from an upper end portion of the concave wall portion 21a, a convex wall portion 21d that extends downward from a lower end portion of the shoulder wall portion 21b, and a convex wall portion 21e that extends upward from an upper end portion of the shoulder wall portion 21c. In other words, the outer wall portion 21 includes a groove section A2 (see FIG. 5) located intermediate of the up-down direction length of the outer wall portion 21, extending in the front-rear direction, and recessed inwardly of the front side frame 2 (inward in the vehicle width direction).

The outer panel 20 has a front end portion located rearwardly of a front end portion of the inner panel 10 (see FIG. 1). A front end portion of the outer wall portion 21 of the outer panel 20 is formed in a curved shape such that the front end portion extends outward in the vehicle width direction as it extends forward, forming a fixation portion for fixing the branch frame 30. In this embodiment, the concave wall portion 21a of the outer wall portion 21 projects further than other portions of the outer wall portion 21 to form the fixation portion for fixing the branch frame 30.

Lower Member

The lower member 3 is a metal structural member provided on the vehicle width direction outer side of the front side frame 2 and extending in the front-rear direction. The lower member 3 is a front extension portion of the upper member 4 and has a curved shape such that the lower member 3 extends upward as it extends rearward. The lower member 3 will be described later in detail.

Upper Member and Front Pillar

The upper member 4 is a metal structural member that extends in the front-rear direction at a higher position than the front side frame 2 and connects between a rear end portion of lower member 3 and a lower end portion of the front pillar 5. The front pillar 5 is a metal structural member that constitutes a left or right corner portion on a front side of a vehicle cabin.

Branch Frame

The branch frame 30 is a metal panel member attached to and between the front side frame 2 and a front end portion of the lower member 3. As shown in FIG. 2, the branch frame 30 is integrally includes a convex wall portion 31 that constitutes an intermediate portion located intermediate of an up-down direction length of the branch frame 30, a shoulder wall portion 32 that extends substantially inward in the vehicle width direction (extends forward) from a lower end portion of the convex wall portion 31, and a shoulder wall portion 33 that extends substantially inward in the vehicle width direction (extends forward) from an upper end portion of the convex wall portion 31. In addition, the branch frame 30 is integrally provided with a concave wall portion 34 that extends downward from a vehicle width direction inner end portion of the shoulder wall portion 32, a concave wall portion 35 that extends upward from a vehicle width direction inner end portion of the shoulder wall portion 33, a rim wall portion (flange portion) 36 that extends outward in the vehicle width direction (extends rearward) from a lower end portion of the concave wall portion 34, and a rim wall portion (flange portion) 37 that extends outward in the vehicle width direction (extends rearward) from an upper end portion of the concave wall portion 35. In other words, the branch frame 30 includes a groove section A3 (see FIGS. 5 and 6) located intermediate of the up-down direction length of the branch frame 30, extending in the front-rear direction, and projecting outward in the vehicle width direction. The convex wall portion 31, the shoulder wall portions 32 and 33, and the concave wall portions 34 and 35 together constitute a body wall portion of the branch frame 30.

As shown in FIG. 1, the branch frame 30 has a curved shape that is convex toward a front end portion of the inner panel 10 of the side frame 2 in plan view (in other words, the branch frame 30 has a curved shape that is convex substantially toward the front of the vehicle and substantially toward a vehicle width direction inner side of the vehicle in plan view). A forward portion of the branch frame 30 is located forwardly of the front end portion of the outer panel 20 of the front side frame 2 and is exposed from the front side frame 2. A rearward portion of the branch frame 30 is located rearwardly of the front end portion of the outer panel 20 of the front side frame 2 and is housed in the front side frame 2.

Figure 6:
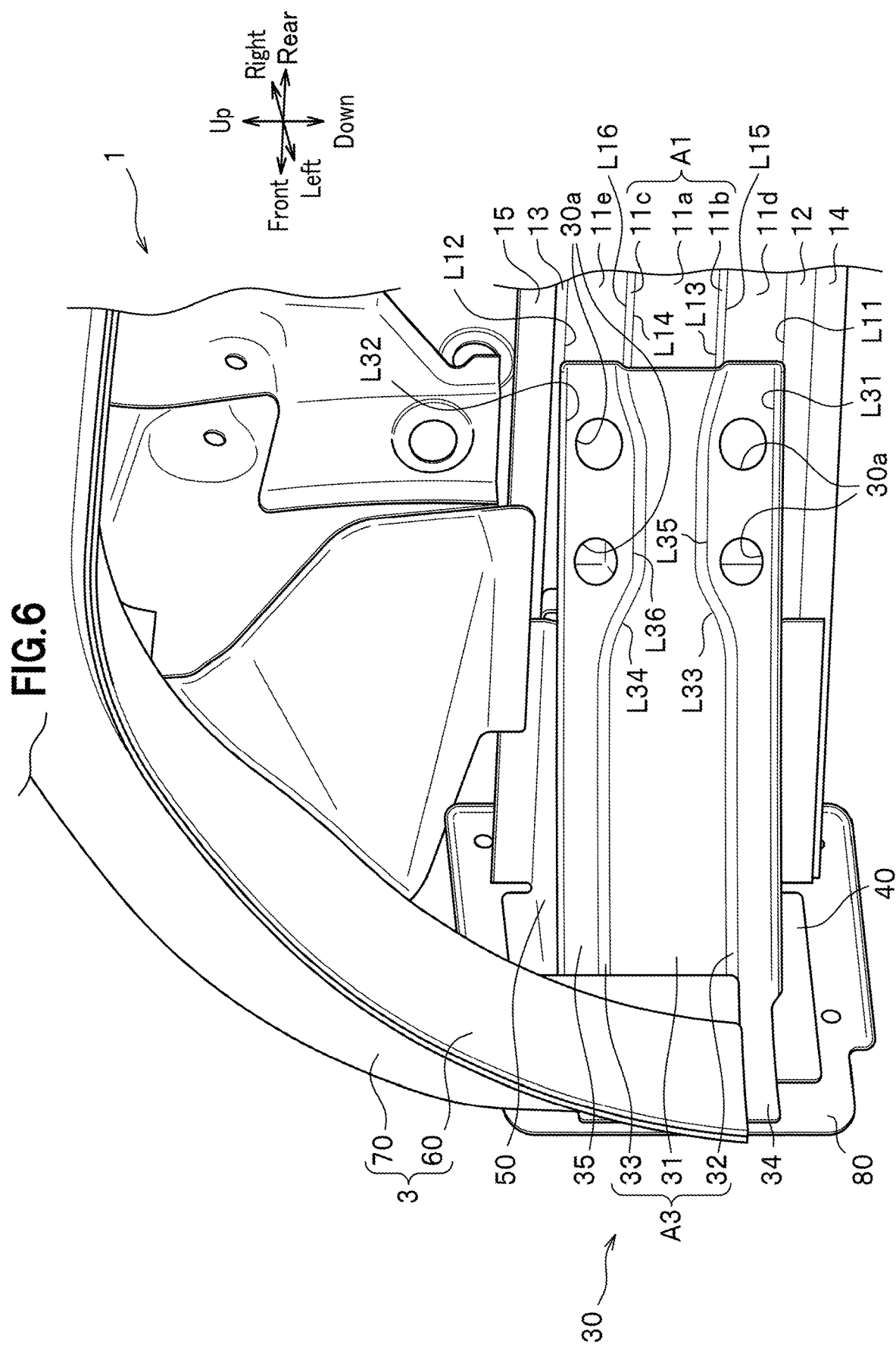
FIG. 6 is a perspective view schematically showing a state of the vehicle body front structure according to the embodiment of the present invention after removing an outer panel from the vehicle body front structure shown in FIG. 5.

As shown in FIG. 6, a plurality of openings 30a are formed on portions of the branch frame 30 that are housed in the front side frame 2 (portions of the concave wall portions 34 and 35 that are located away from the inner wall portion 11 in this embodiment). The purpose of the openings 30a is to allow a welding gun to be inserted therethrough when joining the bracket 90 (see FIG. 3) to the inner panel 10 on a portion thereof located forwardly of the openings 30a by spot welding.

As shown in FIG. 3, a front end portion of the branch frame 30 extends substantially in the vehicle width direction and is located at substantially the same front-rear direction position as that of the front end portion of the inner panel 10.

A rear end portion of the branch frame 30 extends in a substantially front-rear direction and is joined by welding or the like to an inner surface side of the inner wall portion 11 of the front side frame 2 at a portion thereof located on the forward side of a later-described bending portion 2A. In more detail, at the rear end portion of the branch frame 30, the concave wall portion 34 is joined to the convex wall portion 11d of the inner wall portion 11 by welding or the like and the concave wall portion 35 is joined to the convex wall portion 11e of the inner wall portion 11 by welding or the like (see the chain double-dashed line in FIG. 2).

An intermediate portion of the branch frame 30 that is located intermediate of the front-rear direction length of the branch frame 30 is joined to an inner surface side of a front end portion (a region formed into a curve) of the outer wall portion 21 of the front side frame 2 by welding or the like. In more detail, at the front-rear direction intermediate portion of the branch frame 30, the convex wall portion 31 is joined to the concave wall portion 21a of the outer wall portion 21 by welding or the like (see FIG. 2).

Lower Coupling Plate

Figure 4:
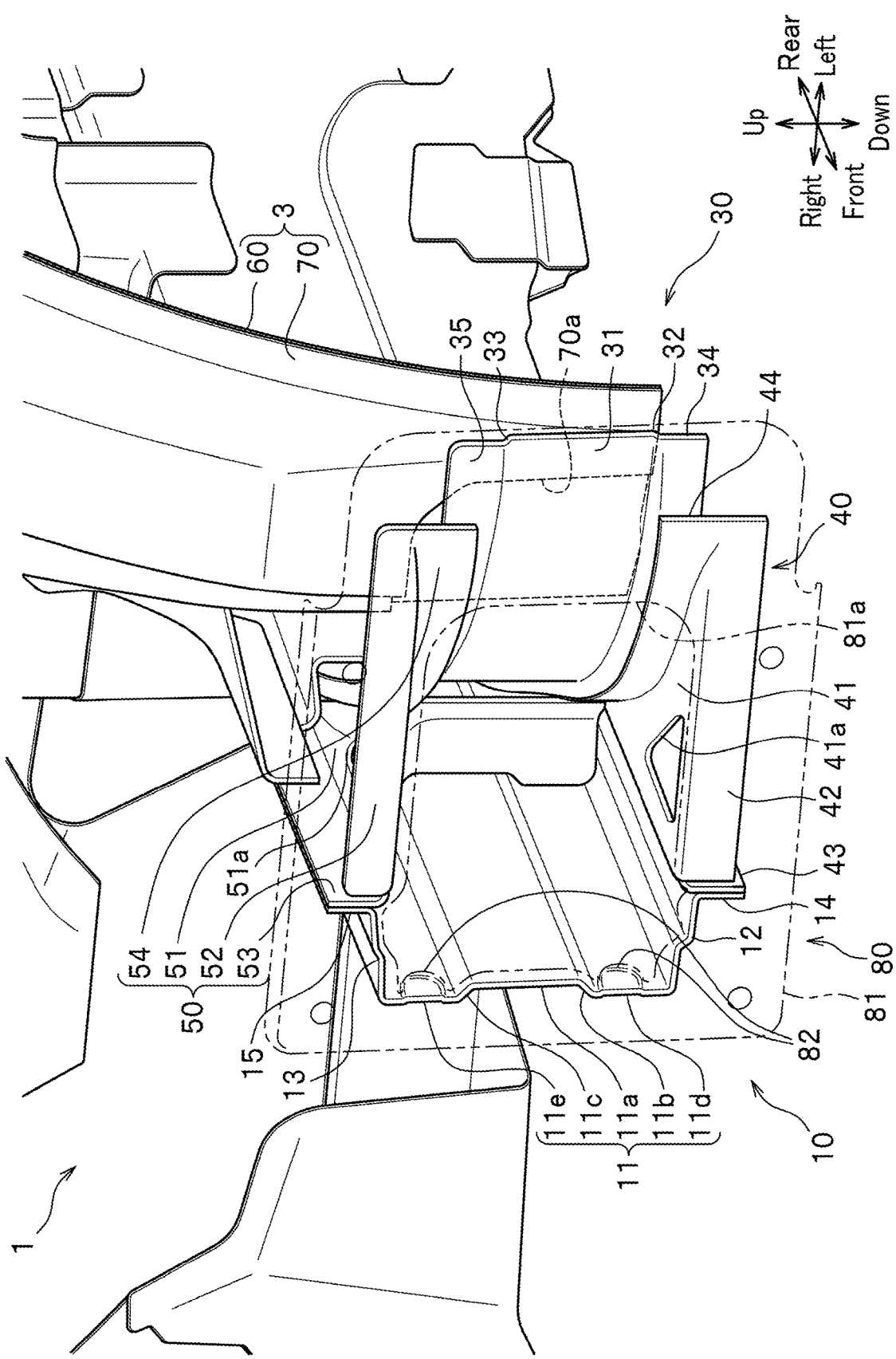
FIG. 4 is a perspective view schematically showing the vehicle body front structure according to the embodiment of the present invention.

As shown in FIGS. 2 and 4, the coupling plate 40 is a metal panel member attached to and between a lower front end portion of the front side frame 2 and a lower front end portion of the branch frame 30. The coupling plate 40 integrally includes a lower wall portion 41 that has a substantially triangular shape such that a width of the lower wall portion 41 gradually decreases as it extends rearward in plan view, a front flange portion 42 that extends downward from a front end portion of the lower wall portion 41, an inner flange portion 43 that extends downward from a vehicle width direction inner end portion of the lower wall portion 41, and an outer flange portion 44 that extends upward from a vehicle width direction outer end portion of the lower wall portion 41.

The lower wall portion 41 is provided with a hole 41a (see FIG. 3) having a triangular shape. That means, according to the present embodiment, the lower wall portion 41 is in the form of a substantially triangular frame in plan view. The front flange portion 42 is joined to the bumper beam attachment plate 80 (see FIG. 4) by welding or the like. The inner flange portion 43 is joined to the flange portion 14 of the inner panel 10 by welding or the like. The outer flange portion 44 (and a later described ridgeline L41) has a curved shape that is convex toward a front end portion of the side frame 2 in plan view, to follow the shape of the branch frame 30. The outer flange portion 44 is joined to the concave wall portion 34 of the branch frame 30 by welding or the like.

Upper Coupling Plate

The coupling plate 50 is a metal panel member attached to and between an upper front end portion of the front side frame 2 and an upper front end portion of the branch frame 30. The coupling plate 50 integrally includes an upper wall portion 51 that has a substantially triangular shape such that a width of the upper wall portion 51 gradually decreases as it extends rearward in plan view, a front flange portion 52 that extends upward from a front end portion of the upper wall portion 51, an inner flange portion 53 that extends upward from a vehicle width direction inner end portion of the upper wall portion 51, and an outer flange portion 54 that extends downward from a vehicle width direction outer end portion of the upper wall portion 51.

The upper wall portion 51 is provided with a hole 51a (see FIG. 1) having a triangular shape. That means, according to the present embodiment, the upper wall portion 51 is in the form of a substantially triangular frame in plan view. The front flange portion 52 is joined to the bumper beam attachment plate 80 (see FIG. 4) by welding or the like. The inner flange portion 53 is joined to the flange portion 15 of the inner panel 10 by welding or the like. The outer flange portion 54 (and a later described ridgeline L51) has a curved shape that is convex toward the front end portion of the side frame 2 in plan view, to follow the shape of the branch frame 30. The outer flange portion 54 is joined to the concave wall portion 35 of the branch frame 30 by welding or the like.

On a forward side of the front end portion of the outer panel 20, the inner panel 10, the branch frame 30, and the coupling plates 40 and 50 together define a closed cross-sectional structure in front view.

Lower Member

As shown in FIG. 4, the lower member 3 is formed by joining a lower panel 60 that constitutes a lower part of the lower member 3 to an upper panel 70 that constitutes an upper part of the lower member 3 by welding or the like.

Lower Panel

The lower panel 60 includes a lower wall portion of the lower member 3. A vehicle width direction inner end portion of a front end portion of the lower panel 60 is joined to the branch frame 30 by welding or the like (see FIG. 3).

Upper Panel

The upper panel 70 includes an upper wall portion, an inner wall portion, and an outer wall portion of the lower member 3. The upper panel 70 has a front end portion at which a cutout portion 70a is formed by largely cutting out a vehicle width direction inner portion of the front end portion. A vehicle width direction outer end portion of the front end portion of the upper panel 70 is stacked on the branch frame 30 and the bumper beam attachment plate 80 in three layers and joined together by welding or like (see FIG. 3).

Accordingly, the lower member 3 has a lower front end portion where the branch frame 30, the lower panel 60, and the upper panel 70 together define a closed cross-section in plan view.

Bumper Beam Attachment Plate

The bumper beam attachment plate 80 is a metal panel member fixed to the front end portion of the front side frame 2 and to front end portions of the coupling plates 40 and 50. The bumper beam attachment plate 80 integrally includes a body portion 81 that is in the form of a substantially rectangular frame in front view, and flange portions 82 that extend rearward from an edge portion of an opening 81a of the body portion 81. A not-illustrated bumper beam is fixed to a front side of the body portion 81 by using bolts and the like.

The body portion 81 includes a lower side portion (on a lower side of the opening 81a) fixed to the front flange portion 42 of the coupling plate 40 by welding or like. The body portion 81 includes an upper side portion (on an upper side of the opening 81*a*) fixed to the front flange portion 52 of the coupling plate 50 by welding or like. The body portion 81 includes an outer side portion (on a vehicle width direction outer side of the opening 81*a*) joined to the convex wall portion 31 and the concave wall portions 34 and 35 of the branch frame 30 by welding or like. The flange portions 82, which extend rearward from an inner side portion (vehicle width direction inner edge of the opening 81*a*) of the body portion 81, are joined to the convex wall portions 11*d* and the 11*e* of the inner panel 10 by welding or like.

Bracket

As shown in FIG. 3, the bracket 90 is a metal member attached to and between the inner wall portion 11 of the inner panel 10 and the branch frame 30 in the front side frame 2. The bracket 90 includes a vehicle width direction outer end portion joined to the front-rear direction intermediate portion of the branch frame 30 by welding or the like and holds the branch frame 30 in conjunction with the front end portion of the outer wall portion 21 of the outer panel 20 in a manner that sandwiches the branch frame 30 therebetween. The bracket 90 includes a vehicle width direction inner end portion joined by welding or the like to a portion of the inner wall portion 11 of the inner panel 10 that is located forwardly of the rear end portion of the branch frame 30.

In the present embodiment, the bracket 90 also functions as a sub-frame mount for fixing a sub-frame, which supports an engine of the vehicle, to the front side frame 2. Incidentally, the lower wall portion 12 of the inner panel 10 has a hole 12*a*, which is used for fixing the sub-frame, in the vicinity of the bracket 90.

Load Transmission in the Event of Small Overlap Collision

If a collision (small overlap collision) occurs on a vehicle width direction outer side of the front side frame 2 of a vehicle with the vehicle body front structure 1, a collision load is inputted to the front end portions of the branch frame 30 and of the coupling plates 40 and 50 through the bumper beam and the bumper beam attachment plate 80.

A portion of the collision load inputted to the front end portion of the branch frame 30 is transmitted to the lower member 3.

Another portion of the collision load inputted to the front end portion of the branch frame 30 is transmitted through the branch frame 30 along the curved shape thereof and then transmitted to the outer panel 20 from the front-rear direction intermediate portion of the branch frame 30. The groove section A3 (convex wall portion 31 and shoulder wall portions 32 and 33) of the branch frame 30 is aligned with the groove section A2 (concave wall portion 21*a* and shoulder wall portions 21*b* and 21*c*) of the outer panel 20 in the front-rear direction (see FIG. 5). In more detail, a ridgeline L33 formed between the convex wall portion 31 and the shoulder wall portion 32 of the branch frame 30 is aligned with a ridgeline L23 formed between the concave wall portion 21*a* and the shoulder wall portion 21*b* of the outer panel 20 in the front-rear direction. In addition, a ridgeline L34 formed between the convex wall portion 31 and the shoulder wall portion 33 of the branch frame 30 is aligned with a ridgeline L24 formed between the concave wall portion 21*a* and the shoulder wall portion 21*c* of the outer panel 20 in the front-rear direction. With the above-described configuration, the collision load is preferably transmitted from the groove section A3 of the branch frame 30 to the groove section A2 of the outer panel 20.

The rest of the collision load inputted to the front end portion of the branch frame 30 is transmitted through the branch frame 30 along the curved shape thereof and then transmitted to the inner panel 10 from the rear end portion of the branch frame 30. A ridgeline L31 formed between the concave wall portion 34 and the rim wall portion 36 of the branch frame 30 is aligned with a ridgeline L11 formed between the convex wall portion 11*d* and the lower wall portion 12 of the inner panel 10 in the front-rear direction (see FIG. 6). With the above-described configuration, the collision load is preferably transmitted from the ridgeline L31 of the branch frame 30 to the ridgeline L11 of the inner panel 10.

In addition, a ridgeline L32 formed between the concave wall portion 35 and the rim wall portion 37 of the branch frame 30 is aligned with a ridgeline L12 formed between the convex wall portion 11*e* and the upper wall portion 13 of the inner panel 10 in the front-rear direction (see FIG. 6). With the above-described configuration, the collision load is preferably transmitted from the ridgeline L32 of the branch frame 30 to the ridgeline L12 of the inner panel 10.

In addition, the groove section A3 (convex wall portion 31 and shoulder wall portions 32 and 33) of the branch frame 30 is aligned with the groove section A1 (concave wall portion 11*a* and shoulder wall portions 11*b* and 11*c*) of the inner panel 10 in the front-rear direction (see FIG. 6). In more detail, the ridgeline L33 formed between the convex wall portion 31 and the shoulder wall portion 32 of the branch frame 30 is aligned with a ridgeline L13 formed between the concave wall portion 11*a* and the shoulder wall portion 11*b* of the inner panel 10 in the front-rear direction. In addition, the ridgeline L34 formed between the convex wall portion 31 and the shoulder wall portion 33 of the branch frame 30 is aligned with a ridgeline L14 formed between the concave wall portion 11*a* and the shoulder wall portion 11*c* of the inner panel 10 in the front-rear direction. In addition, a ridgeline L35 formed between the shoulder wall portion 32 and the concave wall portion 34 of the branch frame 30 is aligned with a ridgeline L15 formed between the shoulder wall portion 11*b* and the convex wall portion 11*d* of the inner panel 10 in the front-rear direction. In addition, a ridgeline L36 formed between the shoulder wall portion 33 and the concave wall portion 35 of the branch frame 30 is aligned with a ridgeline L16 formed between the shoulder wall portion 11*c* and the convex wall portion 11*e* of the inner panel 10 in the front-rear direction. With the above-described configuration, the collision load is preferably transmitted from the groove section A3 of the branch frame 30 to the groove section A1 of the inner panel 10.

As described, a portion of the collision load inputted to the front end portion of the coupling plate 40 is transmitted to the outer panel 20. Here, the ridgeline L41 formed between the lower wall portion 41 and the outer flange portion 44 of the coupling plate 40 is aligned with a ridgeline L21 formed between the convex wall portion 21*d* and the lower wall portion 22 of the outer panel 20 in the front-rear direction. With the above-described configuration, the collision load is preferably transmitted from the ridgeline L41 of the coupling plate 40 to the ridgeline L21 of the outer panel 20. Note that a ridgeline L42 formed between the lower wall portion 41 and the inner flange portion 43 of the coupling plate 40 is also aligned with the ridgeline L21 formed between the convex wall portion 21*d* and the lower wall portion 22 of the outer panel 20 in the front-rear direction, thus contributing to the transmission of the collision load.

In addition, the ridgeline L51 formed between the upper wall portion 51 and the outer flange portion 54 of the coupling plate 50 is aligned with a ridgeline L22 formed between the convex wall portion 21e and the upper wall portion 23 of the outer panel 20 in the front-rear direction. With the above-described configuration, the collision load is preferably transmitted from the ridgeline L51 of the coupling plate 50 to the ridgeline L22 of the outer panel 20. Note that a ridgeline L52 formed between the upper wall portion 51 and the inner flange portion 53 of the coupling plate 50 is also aligned with the ridgeline L21 formed between the convex wall portion 21d and the lower wall portion 22 of the outer panel 20 in the front-rear direction, thus contributing to the transmission of the collision load.

Here, the alignment in the front-rear direction may mean that either a rear end portion of a forward groove section is continuous with a front end portion of a rearward groove section or a rear end portion of a forward ridgeline is continuous with a front end portion of a rearward ridgeline. Alternatively, the alignment in the front-rear direction may mean that either a rear end portion of a forward groove section is located away from and on an extension of front end portion of a rearward groove section or a rear end portion of a forward ridgeline is located away from and on an extension of a front end portion of a rearward ridgeline.

The ridgeline L41 of the coupling plate 40 is opposed to the ridgeline L31 of the branch frame 30 on a vehicle width direction outer side of the front side frame 2, and the ridgeline L51 of the coupling plate 50 is opposed to the ridgeline L32 of the branch frame 30 on the vehicle width direction outer side of the front side frame 2.

Bending Portions of Front Side Frame

As shown in FIG. 1, the front side frame 2 of the vehicle body front structure 1 includes bending portions 2A, 2B and 2C in this order. Each of the bending portions 2A, 2B and 2C is permitted to be bent when a collision load is applied thereto from a front side. The chain line in FIG. 1 illustrates the shape of the front side frame 2 when it is bent due to the collision load from the front side.

The foremost bending portion 2A is located rearwardly of the fixation portion for fixing the branch frame 30 to the outer wall portion 21 of the outer panel 20. The collision load is inputted, from the coupling plates 40 and 50 and via branch frame 30, to the outer wall portion 21 obliquely from the outer side to the inner side in the vehicle width direction. Accordingly, the collision load causes the bending portion 2A to be bent into a shape that is convex toward the inner side in the vehicle width direction.

The bending portion 2B, which is in between the foremost bending portion 2A and the rearmost bending portion 2C, is located at a portion of the front side frame 2 to which a damper housing 6 is fixed. As the inner wall portion 11 is reinforced by the fixation of the damper housing 6 to the front side frame 2, the collision load causes the bending portion 2B to be bent into a shape that is convex toward an outer side in the vehicle width direction.

The rearmost bending portion 2C is located at a portion of the front side frame 2 that is bent outward in the vehicle width direction. At the bending portion 2C, a sub-frame mount 7 is attached to a vehicle width direction inner portion of the front side frame 2. The bending portion 2C is formed in a shape curved outward in the vehicle width direction in advance and has a vehicle width direction inner portion reinforced by the fixation of front side frame 2 to the sub-frame mount 7. Thus, the collision load causes the bending portion 2C to be bent into a shape that is convex toward the inner side in the vehicle width direction.

The vehicle body front structure 1 according to the embodiment of the present invention has the following features: the vehicle body front structure 1 includes a side frame (front side frame 2) extending in the front-rear direction in a front part of the vehicle body, the branch frame 30 provided on a vehicle width direction outer side of the side frame, and coupling members (coupling plates 40 and 50) attached to and between the side frame and the branch frame 30; the side frame has an inner wall portion 11 on a vehicle width direction inner side and an outer wall portion 21 on a vehicle width direction outer side; the inner wall portion 11 has ridgelines L11 and L12 formed thereon; the outer wall portion 21 has ridgelines L21 and L22 formed thereon; the branch frame 30 has ridgelines L31 and L32 formed thereon; the coupling members have ridgelines L41 and L51 formed thereon, respectively; the branch frame 30 has a rear end portion housed in the side frame and fixed to the inner wall portion 11 of the side frame at a fixation portion thereof; the ridgelines L31 and L32 of the branch frame 30 are aligned with the ridgelines L11 and L12 of the inner wall portion 11 of the side frame in the front-rear direction; and the ridgelines L41 and L51 of the coupling member are aligned with the ridgelines L21 and L22 of the outer wall portion 21 of the side frame in the front-rear direction.

As a consequence, the vehicle body front structure 1 is capable of transmitting a load (collision load) inputted from a vehicle width direction outer side of the side frame, from the branch frame 30 to the inner wall portion 11 and from each coupling member to the outer wall portion 21. In other words, the vehicle body front structure 1 preferably transmits the load (collision load), which is inputted from a vehicle width direction outer side of the side frame, to the inner wall portion 11 and the outer wall portion 21 of the side frame, and thereby restrains the side frame from moving inward in the vehicle width direction due to the bending of the side frame and absorbs the energy of the collision by causing the side frame to be bent efficiently.

In addition, the vehicle body front structure 1 has the following features: the branch frame has a front end portion located at substantially the same front-rear direction position as a front end portion of the side frame; and the branch frame 30 has a curved shape that is convex toward the front end portion of the side frame in plan view.

As a consequence, according to the vehicle body front structure 1, the branch frame 30 is permitted to extend long and outward in the vehicle width direction. Thus, the vehicle body front structure 1 can preferably receive the load of a collision (frontal collision) that occurs on the vehicle width direction outer side of the side frame. Moreover, when applied to an electric car and the like, the vehicle body front structure 1 can preferably receive the load of a collision (frontal collision) that occurs on the vehicle width direction outer side of the side frame, with the side frame disposed on a vehicle width direction inner position of the electric car and the like.

In addition, the vehicle body front structure 1 has the following features: the coupling members include wall portions (lower wall portion 41 and upper wall portion 51) extending between the side frame and the branch frame 30, and the outer flange portions 44 and 54 extending from the vehicle width direction outer end portions of the wall portions and defining the ridgelines L41 and L51 of the coupling members together with the wall portions between the outer flange portions 44 and 54 and the wall portions; the branch frame 30 includes the body wall portion extending in the front-rear direction, and the flange portions (rim wall portions 36 and 37) extending from the up-down direction end portions of the body wall portion and defining the ridgelines L31 and L32 of the branch frame 30 together with the body wall portion between the flange portions and the body wall portion; and the ridgelines L41 and L51 of the coupling members are respectively opposed to the ridgelines L31 and L32 of the branch frame 30 on a vehicle width direction outer side of the side frame.

As a consequence, according to the vehicle body front structure 1, the ridgelines L41 and L51 of the coupling members are each formed in a curved shape and are respectively opposed to the ridgelines L31 and L32 of the branch frame 30. Thus, the vehicle body front structure 1 can preferably receive the load of a collision (frontal collision) that occurs on the vehicle width direction outer side of the side frame.

In addition, the vehicle body front structure 1 has the following features: the side frame has the inner panel 10 constituting a vehicle width direction inner part of the side frame and including the inner wall portion 11, and the outer panel 20 constituting a vehicle width direction outer part of the side frame and including the outer wall portion 21; the coupling members include the inner flange portions 43 and 53 extending from the vehicle width direction inner end portions of the wall portions of the coupling members, respectively; the inner flange portions 43 and 53 are fixed to the inner panel 10; and the branch frame 30 has an intermediate portion located intermediate of the front-rear direction length of the branch frame 30 and fixed to the outer wall portion 21 of the outer panel 20.

As a consequence, the vehicle body front structure 1 can preferably align the ridgelines L41 and L51 of the coupling members with the ridgelines L21 and L22 of the outer wall portion 21 with a simple structure.

In addition, the vehicle body front structure 1 has the following features: the branch frame 30 includes the groove section A3 recessed outward in the vehicle width direction; the outer wall portion 21 includes the groove section A2 recessed inward in the vehicle width direction; and the groove section A3 of the branch frame 30 and the groove section A2 of the outer wall portion 21 are aligned with each other in the front-rear direction.

As a consequence, the vehicle body front structure 1 can change the direction of the load of a collision (frontal collision) that occurs on the vehicle width direction outer side of the side frame in such a way that the load is transmitted along the branch frame 30, and thereby the load is transmitted to the outer wall portion 21 of the side frame that is offset with respect to the collision load.

In addition, according to the vehicle body front structure 1, the ridgelines L31 and L32 of the branch frame 30 are aligned with the ridgelines L21 and L22, which are formed on the inner wall portion 11 of the side frame, in the front-rear direction.

As a consequence, the vehicle body front structure 1 can change the direction of the load of a collision (frontal collision) that occurs on the vehicle width direction outer side of the side frame in such a way that the load is transmitted along the branch frame 30, and thereby the load is transmitted to the inner wall portion 11 of the side frame that is offset with respect to the collision load.

In addition, the vehicle body front structure 1 has the following features: the branch frame 30 includes the groove section A3 recessed outward in the vehicle width direction; the inner wall portion 11 includes the groove section A1 recessed outward in the vehicle width direction; and the groove section A3 of the branch frame 30 and the groove section A1 of the inner wall portion 11 are aligned with each other in the front-rear direction.

As a consequence, the vehicle body front structure 1 can preferably transmit the load of the collision (frontal collision) that occurs on the vehicle width direction outer side of the side frame to the outer wall portion 21 of the side frame that is offset with respect to the collision load.

In addition, the vehicle body front structure 1 has the following features: the vehicle body front structure 1 further includes the front pillar 5 of the vehicle body, the upper member 4 extending forward from the front pillar 5, and the lower member 3 that is a front extension portion of the upper member 4 that extends forward thereof; the branch frame 30 has a front end portion fixed to the lower member 3; and the front end portion of the branch frame 30 and the lower member 3 together define a closed cross-section.

As a consequence, as the front end portion (vehicle width direction outer end portion) of the branch frame 30 is reinforced by the closed cross-section, the vehicle body front structure 1 can prevent the branch frame 30 from being bent and thereby preferably transmits the load of a collision (frontal collision) that occurs on the vehicle width direction outer side of the side frame to both the side frame and the lower member 3.

In addition, the vehicle body front structure 1 has the following features: the side frame has a fixation portion at which the branch frame 30 is fixed to the outer wall portion 21 of the side frame; the side frame includes the bending portions 2A, 2B and 2C each of which is permitted to be bent when a load is applied thereto from a front side; and the bending portion 2A, which is the foremost of the bending portions 2A, 2B and 2C, is located rearwardly of the fixation portion of the side frame.

As a consequence, the vehicle body front structure 1 can preferably facilitate the bending of the bending portion 2A by the input of the load transmitted from the branch frame 30 to the outer wall portion 21.

In addition, according to the vehicle body front structure 1, the branch frame 30 has the openings 30a on a portion of the branch frame 30 that is housed in the side frame.

As a consequence, the vehicle body front structure 1 can improve workability of installing another component (such as the bracket 90) into the side frame without causing an adverse effect on the capability of the side frame to be bent or causing an adverse effect on the transmission of the load to the side frame.

In addition, according to the vehicle body front structure 1, the side frame extends outward in the vehicle width direction as the side frame extends forward.

As a consequence, the vehicle body front structure 1 can restrain the side frame from being deformed inward in the vehicle width direction due to the bending of the side frame.

This vehicle body front structure 1 is suitably applicable to an electric car in which a high-voltage electric component or the like is arranged on the vehicle width direction inner side of the side frame.

In addition, the vehicle body front structure 1 further includes the bumper beam attachment plate 80 fixed to the front end portion of the side frame and to the front end portions of the coupling members.

As a consequence, the vehicle body front structure 1 can reinforce the coupling between the side frame and the coupling members.

In addition, the vehicle body front structure 1 has the following features: the vehicle body front structure 1 further has the bumper beam attachment plate 80 fixed to the front end portion of the side frame and to the front end portions of the coupling members; the lower member 3 is formed by assembling two panels (lower panel 60 and upper panel 70);

one of the two panels is fixed to the branch frame 30, and the other one of the two panels is fixed to the branch frame 30 and to the bumper beam attachment plate 80; and the branch frame 30 and the two panels together define a closed cross-section.

As a consequence, the vehicle body front structure 1 provides the closed cross-section that reinforces the front end portion (vehicle width direction outer end portion) of the branch frame 30 with a simple structure, thus can preferably prevent the branch frame 30 from being bent, and preferably transmit the load of a collision (frontal collision) that occurs on the vehicle width direction outer side of the side frame to both the side frame and the lower member 3.

In addition, the vehicle body front structure 1 further includes the bracket 90 configured to hold the branch frame 30 in conjunction with the outer wall portion 21 in the side frame in a manner that sandwiches the branch frame 30 between the branch frame 30 and the outer wall portion 21.

As a consequence, the vehicle body front structure 1 can reliably transmit the collision load to the outer wall portion 21 by way of the branch frame 30.

Although a certain embodiment of the present invention has been described above, it is to be understood that the present invention is not limited only to the above-described embodiment and the embodiment of the present invention can be modified as appropriate within the range not departing from the gist of the invention.

What is claimed is:

1. A vehicle body front structure comprising:
   a side frame extending in a front-rear direction in a front part of a vehicle body and having an inner wall portion on a vehicle width direction inner side and an outer wall portion on a vehicle width direction outer side, the inner wall portion having a ridgeline formed thereon, the outer wall portion having a ridgeline formed thereon;
   a branch frame provided on a vehicle width direction outer side of the side frame, the branch frame having a ridgeline formed thereon; and
   a coupling member attached to and between the side frame and the branch frame, the coupling member having a ridgeline formed thereon,
   wherein the branch frame has a rear end portion housed in the side frame and fixed to the inner wall portion of the side frame,
   wherein the ridgeline of the branch frame is aligned with the ridgeline of the inner wall portion of the side frame in the front-rear direction, and
   wherein the ridgeline of the coupling member is aligned with the ridgeline of the outer wall portion of the side frame in the front-rear direction.

2. The vehicle body front structure according to claim 1, wherein the branch frame has a front end portion located at substantially the same front-rear direction position as a front end portion of the side frame, and
   wherein the branch frame has a curved shape that is convex toward the front end portion of the side frame in plan view.

3. The vehicle body front structure according to claim 2, wherein the coupling member includes:
   a wall portion extending between the side frame and the branch frame; and
   an outer flange portion extending from a vehicle width direction outer end portion of the wall portion and defining the ridgeline of the coupling member together with the wall portion between the outer flange portion and the wall portion,
   wherein the branch frame includes:
   a body wall portion extending in the front-rear direction; and
   a flange portion extending from an up-down direction end portion of the body wall portion and defining the ridgeline of the branch frame together with the body wall portion between the flange portion and the body wall portion, and
   wherein the ridgeline of the coupling member and the ridgeline of the branch frame are opposed to each other on a vehicle width direction outer side of the side frame.

4. The vehicle body front structure according to claim 3, wherein the side frame comprises:
   an inner panel constituting a vehicle width direction inner part of the side frame and including the inner wall portion; and
   an outer panel constituting a vehicle width direction outer part of the side frame and including the outer wall portion,
   wherein the coupling member further includes an inner flange portion extending from a vehicle width direction inner end portion of the wall portion of the coupling member,
   wherein the inner flange portion is fixed to the inner panel, and
   wherein the branch frame has an intermediate portion located intermediate of a front-rear direction length of the branch frame and fixed to the outer wall portion of the outer panel.

5. The vehicle body front structure according to claim 2, wherein the branch frame includes a groove section recessed outward in a vehicle width direction,
   wherein the outer wall portion includes a groove section recessed inward in the vehicle width direction, and
   wherein the groove section of the branch frame and the groove section of the outer wall portion are aligned with each other in the front-rear direction.

6. The vehicle body front structure according to claim 2, wherein the ridgeline of the branch frame is aligned with the ridgeline of the inner wall portion of the side frame in the front-rear direction.

7. The vehicle body front structure according to claim 2, wherein the branch frame includes a groove section recessed outward in a vehicle width direction,
   wherein the inner wall portion includes a groove section recessed outward in the vehicle width direction, and
   wherein the groove section of the branch frame and the groove section of the inner wall portion are aligned with each other in the front-rear direction.

8. The vehicle body front structure according to claim 2, further comprising:
   a front pillar of the vehicle body;
   an upper member extending forward from the front pillar; and
   a lower member that is a front extension portion of the upper member that extends forward thereof,
   wherein the front end portion of the branch frame is fixed to the lower member, and
   wherein the front end portion of the branch member and the lower member together define a closed cross-section.

9. The vehicle body front structure according to claim 2, wherein the side frame has a fixation portion at which the branch frame is fixed to the outer wall portion of the side frame, wherein the side frame includes a plurality of bending portions each of which is permitted to be bent when a load is applied thereto from a front side, and a foremost one of the plurality of bending portions is located rearwardly of the fixation portion.

10. The vehicle body front structure according to claim 2, wherein the branch frame has an opening on a portion of the branch frame that is housed in the side frame.

11. The vehicle body front structure according to claim 1, wherein the side frame extends outward in a vehicle width direction as the side frame extends forward.

12. The vehicle body front structure according to claim 1, further comprising a bumper beam attachment plate fixed to a front end portion of the side frame and to a front end portion of the coupling member.

13. The vehicle body front structure according to claim 8, further comprising a bumper beam attachment plate fixed to the front end portion of the side frame and to a front end portion of the coupling member, wherein the lower member is formed by assembling two panels, wherein one of the two panels is fixed to the branch frame, wherein another one of the two panels is fixed to the branch frame and to the bumper beam attachment plate, and wherein the branch frame and the two panels together define a closed cross-section.

14. The vehicle body front structure according to claim 2, further comprising:

a bracket configured to hold the branch frame in conjunction with the outer wall portion in the side frame in a manner that sandwiches the branch frame between the bracket and the outer wall portion.

* * * * *